United States Patent
Amacker (10) Patent No.: US 11,651,686 B2
(45) Date of Patent: May 16, 2023

(54) VEHICULAR SENSOR NETWORK AND METHODS FOR PROVIDING THE SAME

(71) Applicant: Toyota Research Institute, Inc., Los Altos, CA (US)

(72) Inventor: Matthew Amacker, Santa Clara, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 642 days.

(21) Appl. No.: 16/130,680

(22) Filed: Sep. 13, 2018

(65) Prior Publication Data

US 2020/0090512 A1  Mar. 19, 2020

(51) Int. Cl.
| | |
|---|---|
| G08G 1/0967 | (2006.01) |
| H04W 4/02 | (2018.01) |
| H04W 4/46 | (2018.01) |
| G06V 20/58 | (2022.01) |
| H04W 4/38 | (2018.01) |
| G07C 5/00 | (2006.01) |

(Continued)

(52) U.S. Cl.
CPC ....... *G08G 1/096791* (2013.01); *G06V 20/58* (2022.01); *G07C 5/008* (2013.01); *G08G 1/096725* (2013.01); *H04W 4/02* (2013.01); *H04W 4/46* (2018.02); *H04W 76/14* (2018.02); *H04W 84/18* (2013.01); *H04W 4/38* (2018.02); *H04W 4/80* (2018.02)

(58) Field of Classification Search
CPC ....... G08G 1/096791; G08G 1/096725; G06K 9/00805; H04W 84/18; H04W 76/14; H04W 4/46; H04W 4/02; G07C 5/008
See application file for complete search history.

(56) References Cited

U.S. PATENT DOCUMENTS

| | | |
|---|---|---|
| 9,031,089 B2 | 5/2015 | Rubin et al. |
| 9,697,733 B1 | 7/2017 | Penilla et al. |

(Continued)

FOREIGN PATENT DOCUMENTS

| | | | |
|---|---|---|---|
| KR | 10-2017-0070402 A | | 6/2017 |
| KR | 20180003741 | * | 1/2018 |
| WO | WO2019013948 | * | 1/2019 |

OTHER PUBLICATIONS

Andreas Festag et al., "Vehicle-to-vehicle and roadside sensor communication for enhanced road satiety", ResearchGate, Aug. 4, 2015,https://www.researchgate.net/publication/255628651_VEHICLE-TO-VEHICLE_AND_ROADSIDE_SENSOR_COMMUNICATION_FOR_ENHANCED_ROAD_SAFETY (Year: 2015).*

(Continued)

*Primary Examiner* — Jeffrey C Boomer
*Assistant Examiner* — Annmarie Dressler
(74) *Attorney, Agent, or Firm* — Dinsmore & Shohl LLP (57) ABSTRACT

Vehicles and methods for utilizing a vehicle sensor network are provided. A subject vehicle may include a communication component configured to establish a connection with a connectable vehicle when a distance to the connectable vehicle falls below a threshold. The communication component may be further configured to receive a detection alert from the connectable vehicle detecting that an event is or will be occurring. The subject vehicle may further include an operational component configured to modify operation of the subject vehicle based on the detection alert.

15 Claims, 11 Drawing Sheets

(51) Int. Cl.
    *H04W 76/14*     (2018.01)
    *H04W 84/18*     (2009.01)
    *H04W 4/80*     (2018.01)

(56) References Cited

U.S. PATENT DOCUMENTS

| | | |
|---|---|---|
| 9,930,120 B2 | 3/2018 | Gutierrez |
| 2011/0043380 A1 | 2/2011 | Bammert et al. |
| 2016/0148513 A1* | 5/2016 | Beaurepaire ........... G08G 1/143 |
| | | 701/117 |
| 2017/0236420 A1 | 8/2017 | Varoglu et al. |
| 2018/0043884 A1 | 2/2018 | Johnson |
| 2018/0113450 A1 | 4/2018 | Sherony |
| 2018/0204456 A1* | 7/2018 | Philosof ................. G08G 1/012 |
| 2019/0256091 A1* | 8/2019 | Lepp .................... G08G 1/0112 |

OTHER PUBLICATIONS

Steven Keeping, "How the Connected Car Will Disrupt Personal Transport", Mouser Electronics, Jun. 13, 2018, https://www.mouser.com/applications/connected-car-disrupts-personal-transport/ (5 pages total).

Chris Giarratana, "Vehicle-to-vehicle communication systems", Blog, Traffic Safety Store, Safety Resource Center, Dec. 6, 2016, https://www.trafficsafetystore.com/blog/vehicle-to-vehicle-communication/ (9 pages total).

* cited by examiner

VEHICULAR SENSOR NETWORK AND METHODS FOR PROVIDING THE SAME

TECHNICAL FIELD

The present application generally relates to vehicle communication systems, and, more particularly, to utilizing vehicle communication systems for situational awareness among vehicles.

BACKGROUND

Vehicles utilize sensors to detect a variety of objects in their environment. For example, a vehicle may utilize proximity sensors to detect hazards while backing out of a parking spot. However, a vehicle's on-board sensors provide only a limited amount of situational awareness of the surrounding environment. The limitations of a vehicle's sensors can result in a limited ability to react to situations that are not immediately apparent.

SUMMARY

In one embodiment, a subject vehicle may include a communication component configured to establish a connection with a connectable vehicle when a distance to the connectable vehicle falls below a threshold. The communication component may be further configured to receive a detection alert from the connectable vehicle detecting that an event is or will be occurring. The subject vehicle may further include an operational component configured to modify operation of the subject vehicle based on the detection alert.

In another embodiment, a method for utilizing a vehicle sensor network may include establishing a connection between a subject vehicle and a connectable vehicle when a distance between the subject vehicle and the connectable vehicle falls below a threshold. The method may further include receiving, at the subject vehicle, a detection alert from the connectable vehicle indicating an event is or will be occurring. The method may also include modifying operation of the subject vehicle based on the detection alert.

In yet another embodiment, a system may include a subject vehicle and a connectable vehicle. The subject vehicle may include a communication component configured to establish a connection with the connectable vehicle when a distance to the connectable vehicle falls below a threshold and to receive a detection alert from the connectable vehicle detecting that an event is or will be occurring. The subject vehicle may also include an operational component configured to modify operation of the subject vehicle based on the detection alert. The connectable vehicle may include a communication component configured to establish a connection with the connectable vehicle in response to a communication received form the communication component of the subject vehicle. The communication component of the connectable vehicle may also detect that an event is or will be occurring based upon event data and also output the detection alert to the connectable vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to vehicles and methods that utilize vehicle communication systems for situational awareness among vehicles. For example, vehicles may not be able to detect events of interest with their own sensor(s) due to a variety of reasons, such as distance or obfuscation. Vehicles may communicate with other vehicles either directly or indirectly through networks that connect the vehicles. At least some of the vehicles may have one or more sensors that can detect events that may be relevant to other vehicles, such as oncoming vehicles, pedestrians, conditions that warrant slowing down, such as rough weather or construction zones, and the like. By maintaining contact, a vehicle may be alerted to such events that are detected by the sensor(s) of other vehicles. In some embodiments, a dormant vehicle may utilize a low-power mode to conserve energy by not constantly utilizing its sensor(s) to monitor its environment (i.e., the area or vicinity). However, when a vehicle that is seeking information related to potential events in the vicinity approaches, the dormant vehicle may activate and utilize its sensor(s) and report event data to the approaching vehicle. The approaching vehicle may then be able to react to an event that would have otherwise been a surprise. To continue conserving power, the connectable vehicle may return to its dormant state once the approaching vehicle has left the vicinity.

Figure 1:
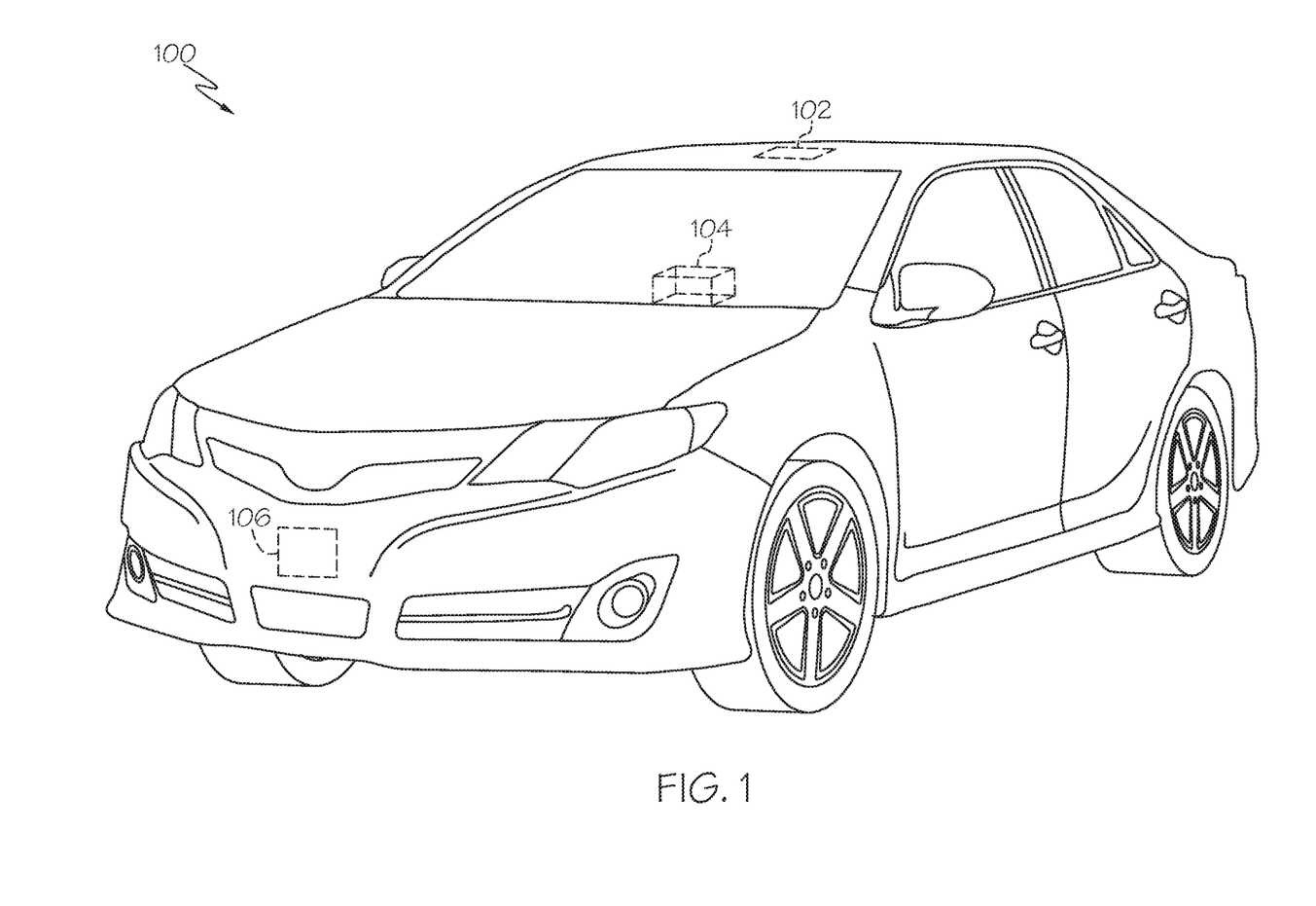
FIG. 1 is a diagram schematically illustrating an exemplary vehicle for implementing various systems and processes, according one or more embodiments shown and described herein.

Turning to FIG. 1, a subject vehicle 100 is depicted, which may include anything capable of transporting one or more passengers, including (but not limited to) cars, trucks, motorcycles, bicycles or any other type of passenger-powered vehicles, aircraft, spacecraft, watercraft, and submarines. A subject vehicle 100 may be navigated by an operator, such as a driver, pilot, captain, etc. In other embodiments, the subject vehicle 100 may be manually operated or partially autonomous, for example where the subject vehicle 100 completes some tasks for a driver, such as parking or keeps the vehicle in a lane. The subject vehicle 100 may also be autonomous, for example where the vehicle operates with no input or minimal input (such as providing destination information or route preferences) from any occupant.

The subject vehicle 100 may utilize one or more transmitters 102 to output information to any suitable target, such as other vehicles within a vehicle-to-vehicle (V2V) communication system or by any other protocol by which the transmitter may facilitate communication within its environment, such as by way of non-limiting example, IrDA, Bluetooth, Wireless USB, Z-Wave, ZigBee, radio waves, other communication protocols, and the like. A transmitter 102 may correspond, for example, to the output devices 204 discussed below with respect to FIG. 2. In this embodiment the subject vehicle 100 may include one or more sensors 106, although other embodiments may not utilize any sensors 106. The subject vehicle 100 may utilize sensors 106 to detect temperature, motion (e.g., radar, lidar, sonar), objects (e.g., cameras and/or visual detection sensors including visual light, infrared, time-of-flight), and other vehicles (e.g., V2V). A sensor 106 may correspond, for example, to the input devices 206 discussed below with respect to FIG. 2. In this embodiment, the subject vehicle 100 may also include communication equipment 212 to send and receive information. Information may include anything digital and/or analog that can be utilized to report information pertaining to the vehicle (such as speed, acceleration, location, traffic conditions, temperature, anything obtained from a sensor 106) and/or receive information pertaining the vehicle (such as operational commands/suggestions). Communication equipment 104 may correspond, for example, to the communication device 212 discussed below with respect to FIG. 2. In some embodiments, communication equipment 212 may include an operational component that may be utilized to affect various vehicle operations based upon autonomous vehicle control and/or driver input. In some embodiments, any combination of the features described above may be utilized within a connectable vehicle, as described in more detail below.

Figure 2:
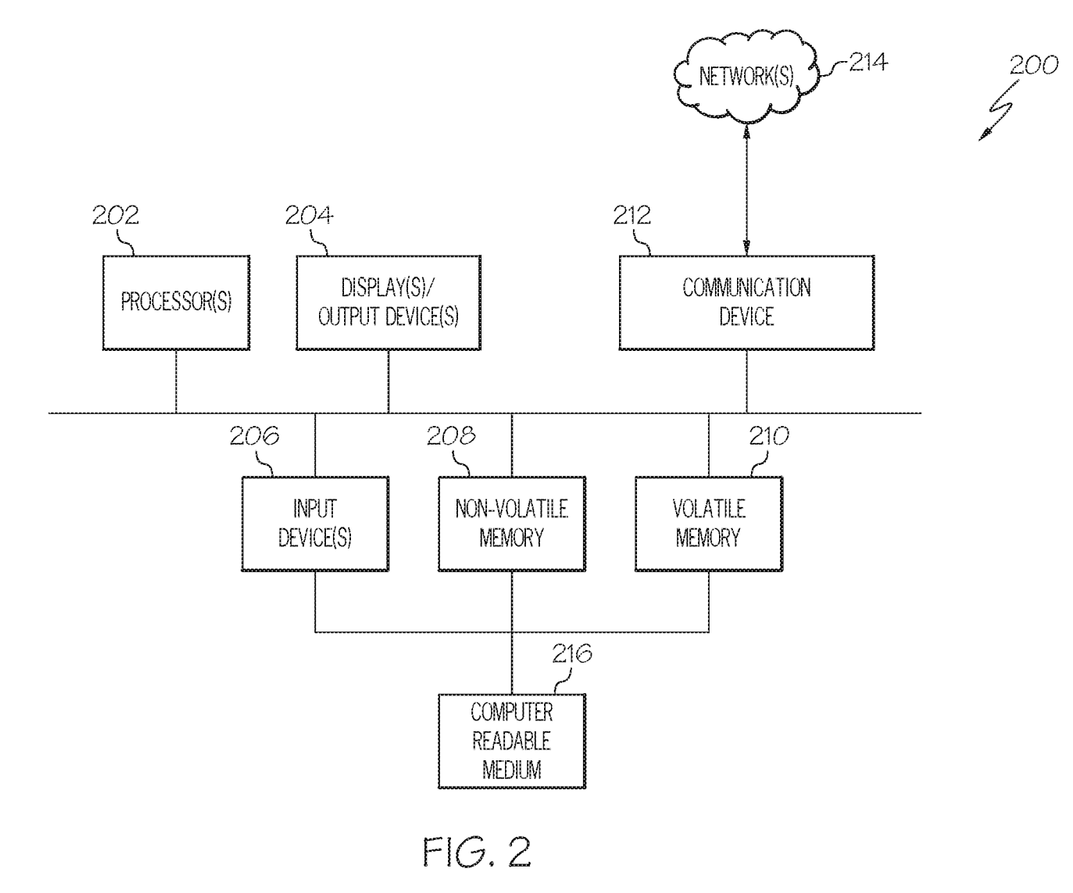
FIG. 2 is a block diagram illustrating computing hardware utilized in one or more devices for implementing various systems and processes, according one or more embodiments shown and described herein.

Turning to FIG. 2, a block diagram illustrates an exemplary computing device 200 through which embodiments of the disclosure can be implemented, such as in a transmitter 102, communication equipment 104, a sensor 106, or any combination thereof. The computing device 200 described herein is but one example of a suitable computing device and does not suggest any limitation on the scope of any embodiments presented. Nothing illustrated or described with respect to the computing device 200 should be interpreted as being required or as creating any type of dependency with respect to any element or plurality of elements. In various embodiments, a computing device 200 may further include, but need not be limited to, a desktop, laptop, server, client, tablet, smartphone, in-robot computing devices, imaging devices, or any other type of device that can utilize data. In an embodiment, the computing device 200 includes at least one processor 202 and memory (non-volatile memory 208 and/or volatile memory 210). The computing device 200 may include non-volatile memory 208 (ROM, flash memory, etc.), volatile memory 210 (RAM, etc.), or a combination thereof. In some embodiments, the at least one processor 202 is coupled to the non-volatile memory 208 and/or volatile memory 210. The computing device 200 may utilize, by way of non-limiting example, RAM, ROM, cache, fiber optics, EPROM/Flash memory, CD/DVD/BD-ROM, hard disk drives, solid-state storage, optical or magnetic storage devices, diskettes, electrical connections having a wire, any system or device that is of a magnetic, optical, semiconductor, or electronic type, or any combination thereof.

The computing device 200 can include one or more displays and/or output devices 204 such as monitors, speakers, headphones, projectors, wearable-displays, holographic displays, and/or printers, for example. This may be utilized, for example, within the subject vehicle 100 respect to FIG. 1 in the form of a sensor 106 and/or communication equipment 104. The computing device 200 may further include one or more input devices 206 which can include, by way of example, any type of mouse, keyboard, disk/media drive, memory stick/thumb-drive, memory card, pen, touch-input device, biometric scanner, voice/auditory input device, motion-detector, camera, scale, etc. As depicted in FIG. 1, one or more sensors 106 may be in communication with various components of the computing device 200, such as to provide data relevant to the subject vehicle 100. Various vehicle components may be in communication with various components of the computing device 200, such as to provide and/or receive relevant data to and/or from the computing device 200.

A communication device 212 (e.g., a communication component) can facilitate communications over a network 214 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. The computing device 200 may include one or more communication devices 212 to facilitate communication with one or more remote devices, which may include, for example, client and/or server devices. A communication device 212 may also be described as a communications module, as these terms may be used interchangeably. The communication device 212 can be communicatively coupled to any device capable of transmitting and/or receiving data via the network 214. Accordingly, the communication equipment 108 can include a communication transceiver for sending and/or receiving any wired or wireless communication. In one embodiment, the communication equipment 104 can be utilized for communication to/from the subject vehicle 100 as discussed herein. In some embodiments, the communication device 212 may incorporate a transmitter 102, communication equipment 104, a sensor 106, or any combination thereof. For example, the communication device 212 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 216 may comprise a plurality of computer readable mediums, each of which may be either a computer readable storage medium or a computer readable signal medium. A computer readable medium 216 may reside, for example, within an input device 206, non-volatile memory 208, volatile memory 210, or any combination thereof. A computer-readable medium 216 includes computer readable storage media, which include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media are non-transitory, and exclude propagated signals and carrier waves.

Figure 3:
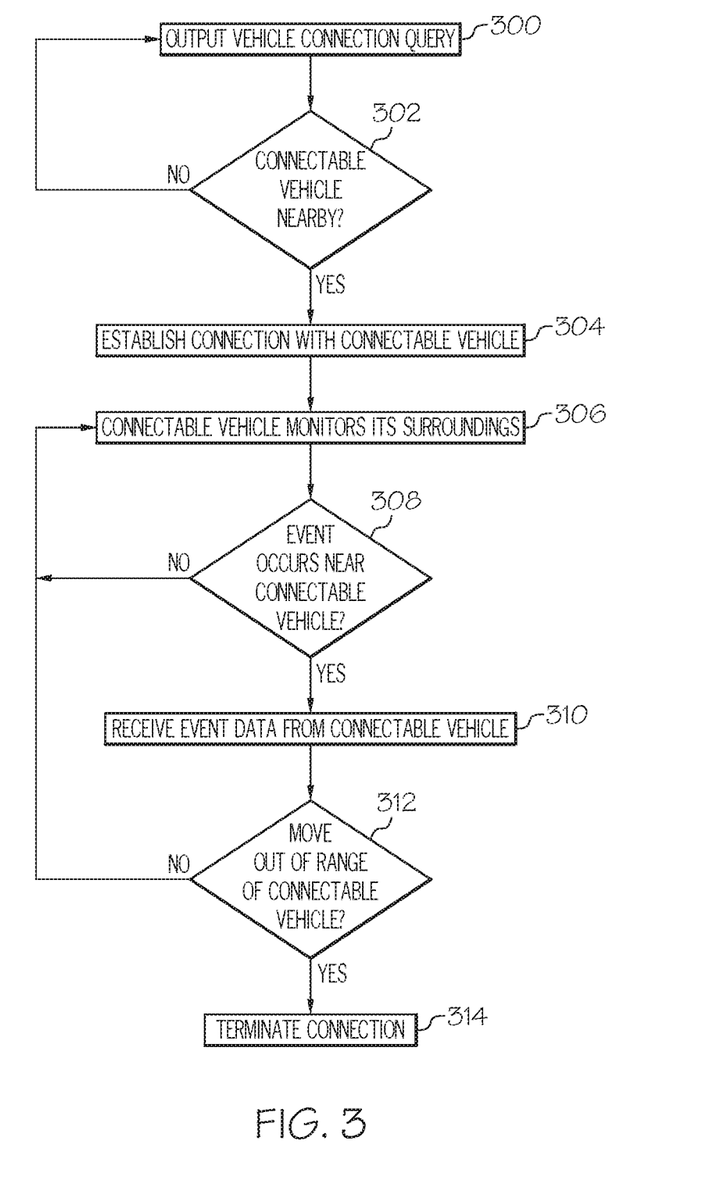
FIG. 3 is a flowchart depicting an exemplary process of utilizing nearby vehicles to monitor events in the vicinity, according to one or more embodiments described and illustrated herein.

Turning now to FIG. 3, a flowchart depicts an exemplary process of utilizing nearby vehicles to monitor events in the area. Events may include, by way of non-limiting examples, one or more pedestrians walking into the path of the subject vehicle (e.g., in front of or behind the subject vehicle), approaching/on-coming vehicle(s) that may not be presently visible from the vantage point of the subject vehicle (wherein such approaching/on-coming vehicle(s) may or may not be in communication with the subject vehicle and/or the connectable vehicle), and/or hazardous road conditions such as construction zones and/or weather conditions (rain, snow, sleet, wind, hail, and the like). By way of non-limiting example, a dedicated connectable vehicle or non-vehicle device may be placed at or near a construction zone to serve as a notification to other vehicles (such as the subject vehicle) of the construction zone such that the driver and/or the vehicle itself may modify vehicular operation(s) accordingly in advance of the construction zone. By way of non-limiting example, modification of vehicle operation may include modification of speed/velocity (braking, accelerating, applying the emergency brake), turning left/right, turning on/off vehicle lights (flashers, turn signal(s), headlight(s), taillight(s)), changing gears such as with a clutch, and the like.

At block 300, the subject vehicle may make a query to connect with connectable vehicles, which may include any connectable vehicles in the vicinity. The query may utilize any suitable wireless protocol, as discussed above with respect to the communication equipment 104 in FIG. 1 and/or the communication device 212 in FIG. 2. At block 302, a determination is made as to whether there are any connectable vehicles nearby in the vicinity, where the vicinity may be any suitable distance/radius. If no connectable vehicle is in the vicinity, then the process returns to block 300. Otherwise, if there is a connectable vehicle in the vicinity, then at block 304, a connection may be established between the subject vehicle and one or more connectable vehicles. In some embodiments, this may be accomplished via a V2V connection, which may utilize any suitable wireless communication protocols as discussed above with respect to the communication equipment 104 in FIG. 1 and/or the communication device 212 in FIG. 2. A connection between the subject vehicle and a connectable vehicle may utilize sessions that are time and/or location-based. In another embodiment, the connection between the subject vehicle and one or more connectable vehicles may utilize one or more networks to connect, which may be in lieu of, or in addition to, a direct connection (such as V2V) between the vehicles. By way of non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks relied upon certain vehicles. Still other examples include centralized networks utilizing servers and other central computing devices to store and/or relay information between vehicles.

At block 306, the connectable vehicle monitors its surroundings, which may be done with its sensors. For example, a connectable vehicle may utilize its sensors as discussed herein to detect various characteristics of objects (vehicles, pedestrians, bicyclists, and the like) in its vicinity, such as an object's motion, shape, size, appearance, temperature, and the like. At block 308, a determination is made as to whether an event is occurring or is predicted to occur near the connectable vehicle. For example, a moving object detected by the connectable vehicle may determine, based upon the current path of the object and the subject vehicle, that their respective paths are likely to come into close proximity or intersect based upon their current trajectories. The subject vehicle and/or the object may self-report their movement(s) (e.g., velocity, direction, and the like) to the connectable vehicle and/or have such movements detected by the connectable vehicle's sensor(s). If no event either occurs or is predicted to occur near the connectable vehicle, then the process returns to block 306. Otherwise, if an event is occurring or is predicted to occur near the connectable vehicle, then the process proceeds to block 310 where the subject vehicle receives event data from the connectable vehicle(s). Event data may include anything of relevance to the current or predicted state of a subject vehicle, such as data indicating an impending or likely intersection between the paths of an object and a subject vehicle. In some embodiments, event data may be utilized to produce map data, such as creating or updating a sensor-produced map based upon vehicle sensor data received from a plurality of connectable vehicles. In some embodiments, anomaly detection may be utilized to compare detected features in the environment with what is detected by connectable vehicles and/or subject vehicles. In some embodiments, the connectable vehicle may provide one or more notifications in addition to (or in lieu of) event data, such as flashing lights, horn honking, and the like. At block 312, a determination is made as to whether the subject vehicle has moved out of range of the connectable vehicle. If so, then the process returns to block 306. Otherwise, the connection between the subject vehicle and the connectable vehicle may terminate at block 314.

Figure 4:
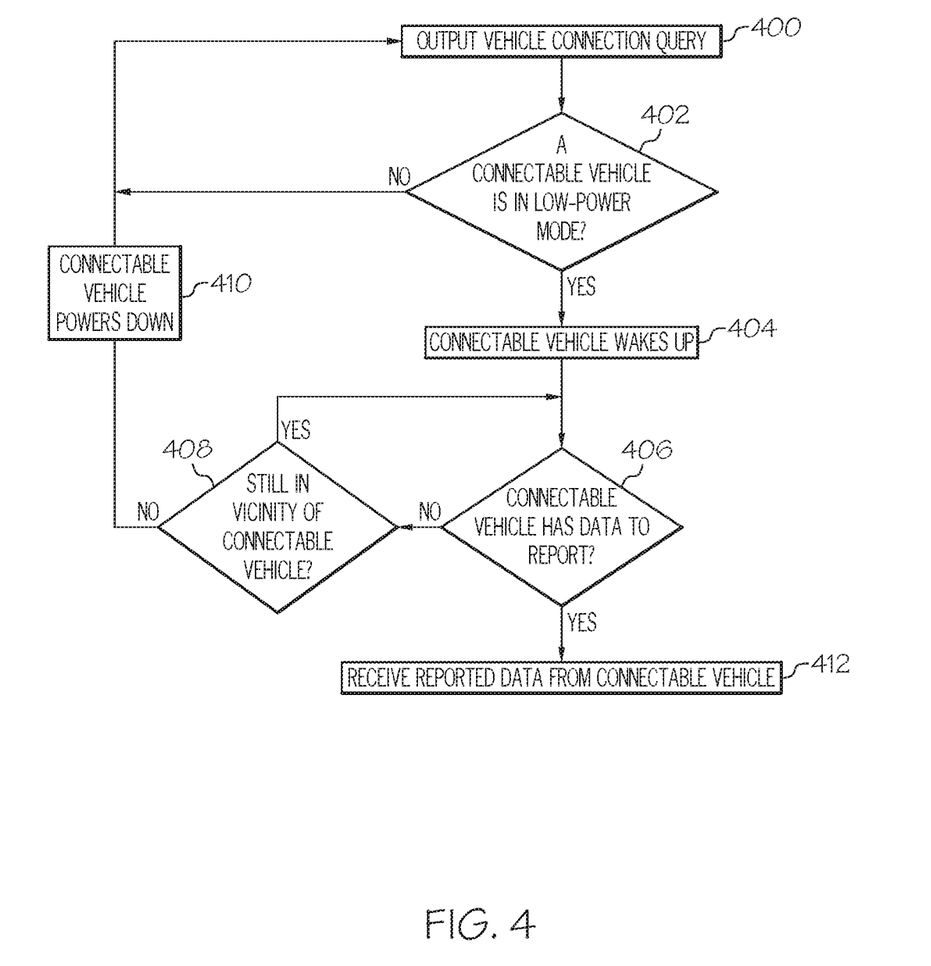
FIG. 4 is a flowchart depicting an exemplary process of receiving reporting data from vehicles in a low-power mode, according to one or more embodiments described and illustrated herein.

Turning now to FIG. 4, a flowchart depicts an exemplary process of receiving reporting data from one or more connectable vehicles in a low-power mode. For example, this exemplary process may save power (such as battery power)

for a connectable vehicle to prolong its ability to report event data and/or maintain power for the user of the connectable vehicle's operator/owner. At block 400, the subject vehicle may output a vehicle connection query to establish a connection with any connectable vehicles in the vicinity. At block 402, a determination is made as to whether there is a connectable vehicle in a low-power mode in the vicinity. If there is not a connectable vehicle in the vicinity, then the process returns to block 400. Otherwise, if there is a connectable vehicle in the vicinity, the process proceeds to block 404 where the connectable vehicle may be activated by the vehicle connection query sent by the subject vehicle at block 400. In some embodiments, activating the connectable vehicle from a low-power mode (or state) activates sensors associated with the activated connectable vehicle. In some embodiments, the connectable vehicle may be activated from its low-power state based upon a predetermined time interval and/or proximity to the subject vehicle. In some embodiments, a subject vehicle may have a preplanned route wherein connectable vehicles may be activated from a low-power mode based upon time, location, and movement data associated with the subject vehicle. This data may in turn be utilized to generate predictions as to when connectable vehicles along the preplanned route should be activated, turn on their sensor(s), and/or monitor the vicinity.

At block 406, once the connectable vehicle has activated from a low-power mode, a determination is made as to whether the connectable vehicle has data to report to the subject vehicle. If not, then at block 408, a determination is made as to whether the connectable vehicle is still in the vicinity of the connectable vehicle. If not, then at block 410, the connectable vehicle may power down in order to return to its low-power state, and process then returns to block 400 where the subject vehicle may again output a connection query. Otherwise, if the connectable vehicle is still in the vicinity of the connectable vehicle, then the process returns to block 406. If the connectable vehicle has data to report at block 406, such as event data, then at block 412 such data may be provided by the connectable vehicle to the subject vehicle. In some embodiments this may include returning the connectable vehicle to the low-power state after the event data has been reported to the subject vehicle and/or operation of the subject vehicle has been modified. In some embodiments, a schedule may be utilized to activate connectable vehicles and/or to power them down to a low-power mode. For example, if a school opens at 9 am and closes at 3 pm, then connectable vehicles in the vicinity may be activated for a threshold period of time before and after to these peak periods that may feature numerous student pedestrians. The connectable vehicles may stay activated until a threshold period of time has elapsed, at which time the connectable vehicle may power down. A threshold period of time may be any amount of time that may be specified by a user, as a pre-existing software parameter, and the like. A threshold period of time may relate to a general value applied to an amount of time that a connectable vehicle remains activated on its own (without further external communication from other vehicles), or may be event-type specific, such as keeping the connected vehicle activated longer for a 9 am activation than at 3 pm activation. A calendar may also be utilized in combination with location data to determine on which dates/times connectable vehicles at that location should be automatically activated.

Figure 5A:
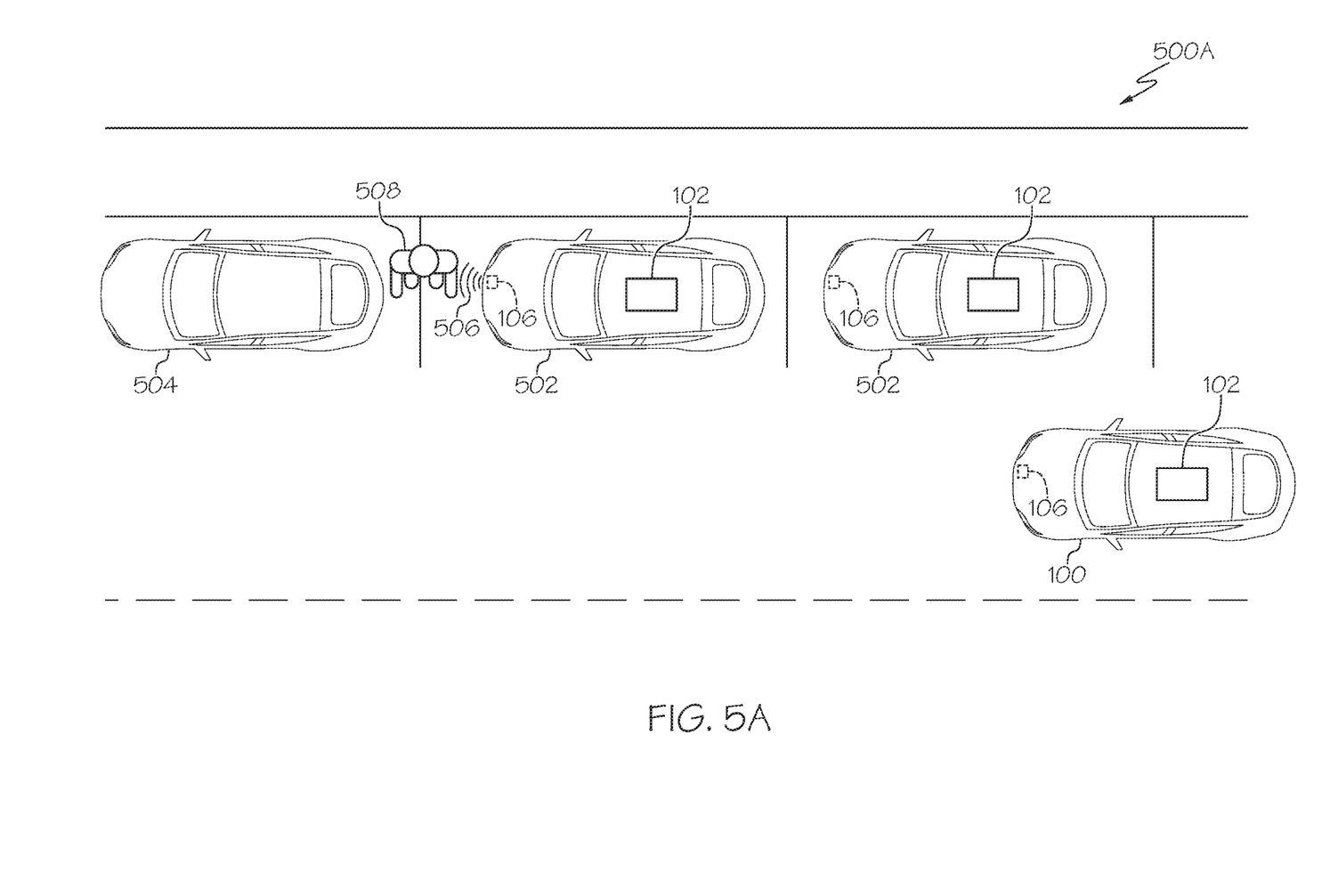
FIG. 5A schematically depicts an overhead view of a pedestrian detected by a sensor of a vehicle parked near a subject vehicle, according to one or more embodiments described and illustrated herein.

Turning to FIG. 5A, an overhead view 500A schematically depicts a pedestrian 508 detected by a sensor 106 of a connectable vehicle 502 parked nearby a subject vehicle 100. In this embodiment, a subject vehicle 100 approaches parked cars (two connectable vehicles 502 and a non-connectable vehicle 504). In this embodiment, a non-connectable vehicle 504 does not have a transmitter 102, communication equipment 104, or sensors 106. In other embodiments a non-connectable vehicle 504 may have a subset of one or more transmitters 102, one or more pieces of communication equipment 104, and/or one or more sensors 106. A sensor 106 on a connectable vehicle 502 detects 506 a pedestrian 508 approaching the path of the subject vehicle 100. This may be accomplished, for example, by tracking the motion of the pedestrian 508 relative to the location and/or path of the subject vehicle 100. In some embodiments, the known path of the subject vehicle 100 may be provided by the subject vehicle to connectable vehicles 502, whereas in other embodiments the connectable vehicles 502 may extrapolate the path of the subject vehicle 100 based upon the current motion of the subject vehicle 100 and/or a map of the vicinity (e.g., a parking garage, a parking lot, a street, and the like). In other embodiments, having the pedestrian 508 near a connectable vehicle 502 in the vicinity of a subject vehicle 100 may cause an automatic transmission 510 of such information to the subject vehicle 100 and/or other vehicles in the vicinity. In this embodiment, the movement of the pedestrian 508 triggers the detection 506 (via lidar, radar, video, and the like), although any other detectable aspect of the pedestrian may be detected, such as body temperature, biometrics, audio, and the like.

Figure 5B:
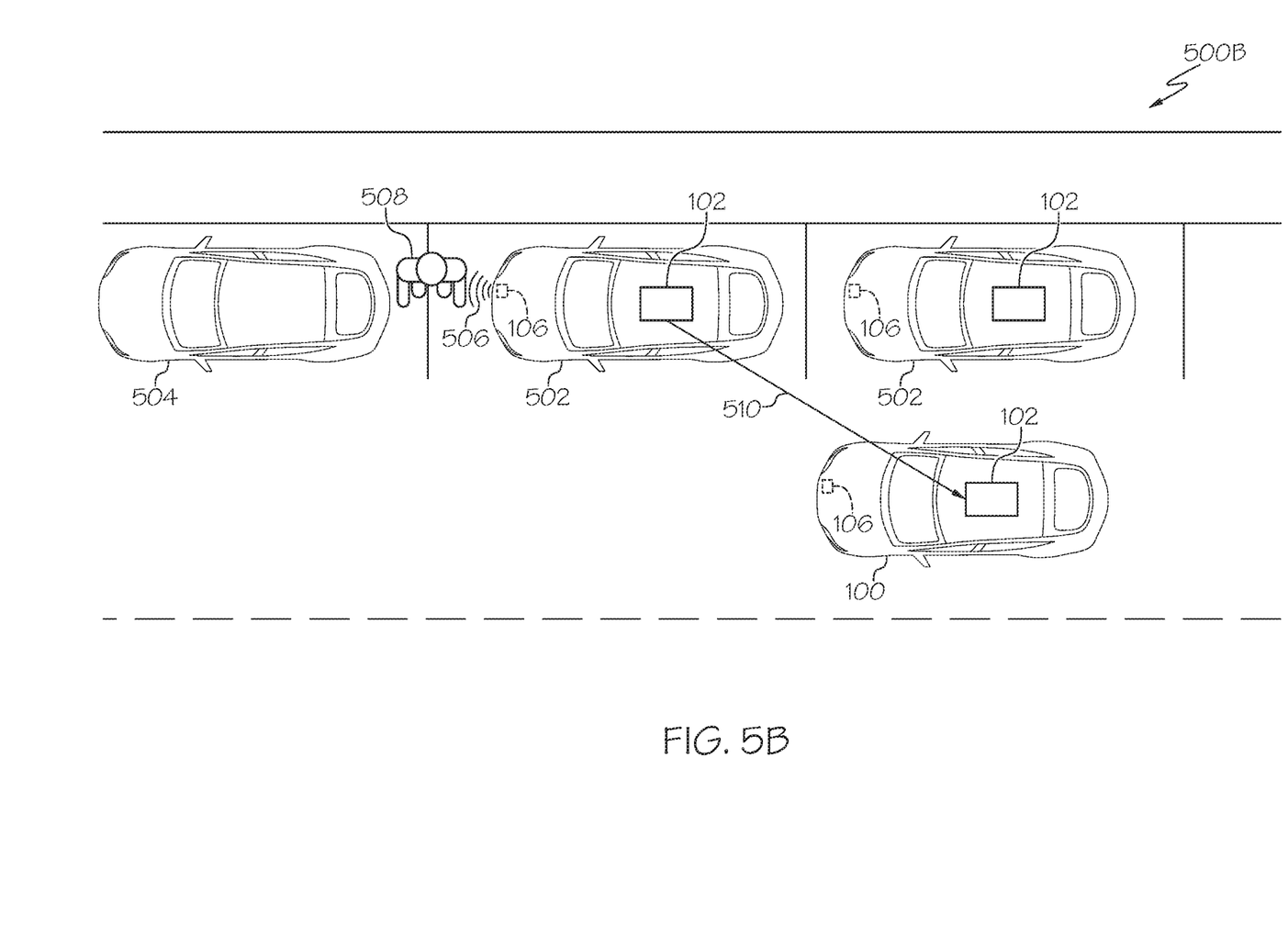
FIG. 5B schematically depicts an overhead view of the nearby vehicle alerting the subject vehicle to presence of the pedestrian, according to one or more embodiments described and illustrated herein.

Turning to FIG. 5B, an overhead view 500B continues with the schematic depiction from FIG. 5A, wherein the nearby vehicle is alerting the subject vehicle 100 to presence of the pedestrian 508. Continuing with the embodiment discussed above in FIG. 5A, the connectable vehicle 502 that detected 506 the pedestrian 508 now utilizes a transmitter 102 to send a transmission 510 to the subject vehicle. In this embodiment the transmission 510 is a warning, but a transmission 510 may be any suitable type of data and/or alert. For example, a bicyclist, skater, animal, vehicle, or a stationary object presently blocking or predicted to block at least part of the path of the subject vehicle 100 may be reported as an alert via a transmission 510 sent to the subject vehicle 100 by the transmitter 102 of a connectable vehicle 502. In some embodiments, there may be more than one subject vehicle 100 at a time, where some or all subject vehicles 100 may receive a given transmission 510. Any connectable vehicle 502 may have one or more sensors 106 and/or one or more transmitters 102. In some embodiments, the connectable vehicle may provide an alert to the pedestrian 508 to warn of the oncoming vehicle, such with flashing of lights and/or audio (alarm sounds, beeping, horn honking, and the like).

Figure 5C:
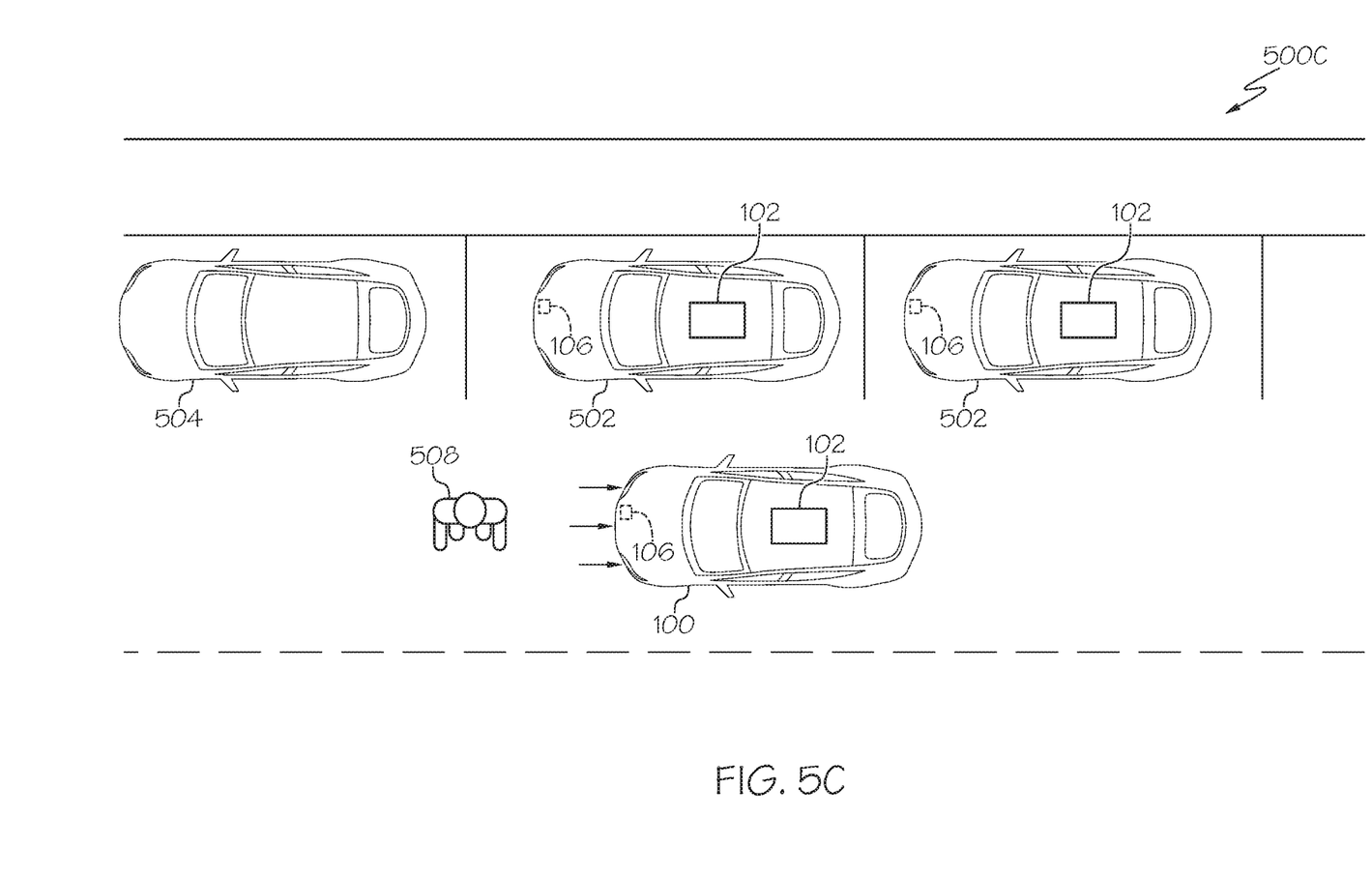
FIG. 5C schematically depicts an overhead view of the pedestrian walking out into the lane of the subject vehicle that has braked in response to the alert, according to one or more embodiments described and illustrated herein.

Turning to FIG. 5C, an overhead view 500C continues with the schematic depiction from FIGS. 5A-B, wherein the pedestrian 508 is now walking out into the lane of the subject vehicle 100, which has braked in response to the alert. In response to having received the transmission 510 from the transmitter 102 of the connectable vehicle 502 in FIG. 5B, the subject vehicle 100 has applied its brakes and has stopped as the pedestrian 508 continues to cross the path of the subject vehicle 100. In some embodiments, the subject vehicle 100 may slow down without stopping, depending upon the conditions. In other embodiments, the subject vehicle 100 may flash its lights and/or produce audio (alarm sounds, beeping, honking the horn, and the like) to warn the pedestrian 508, which may be utilized in addition to slowing down and/or stopping. In some embodiments, the number of connectable vehicles (as a percentage of all vehicles in the vicinity) may be proportional to the number of sensors needed on any particular vehicle within the vicinity, such that fewer sensors may be needed where there are more connectable vehicles.

Figure 6A:
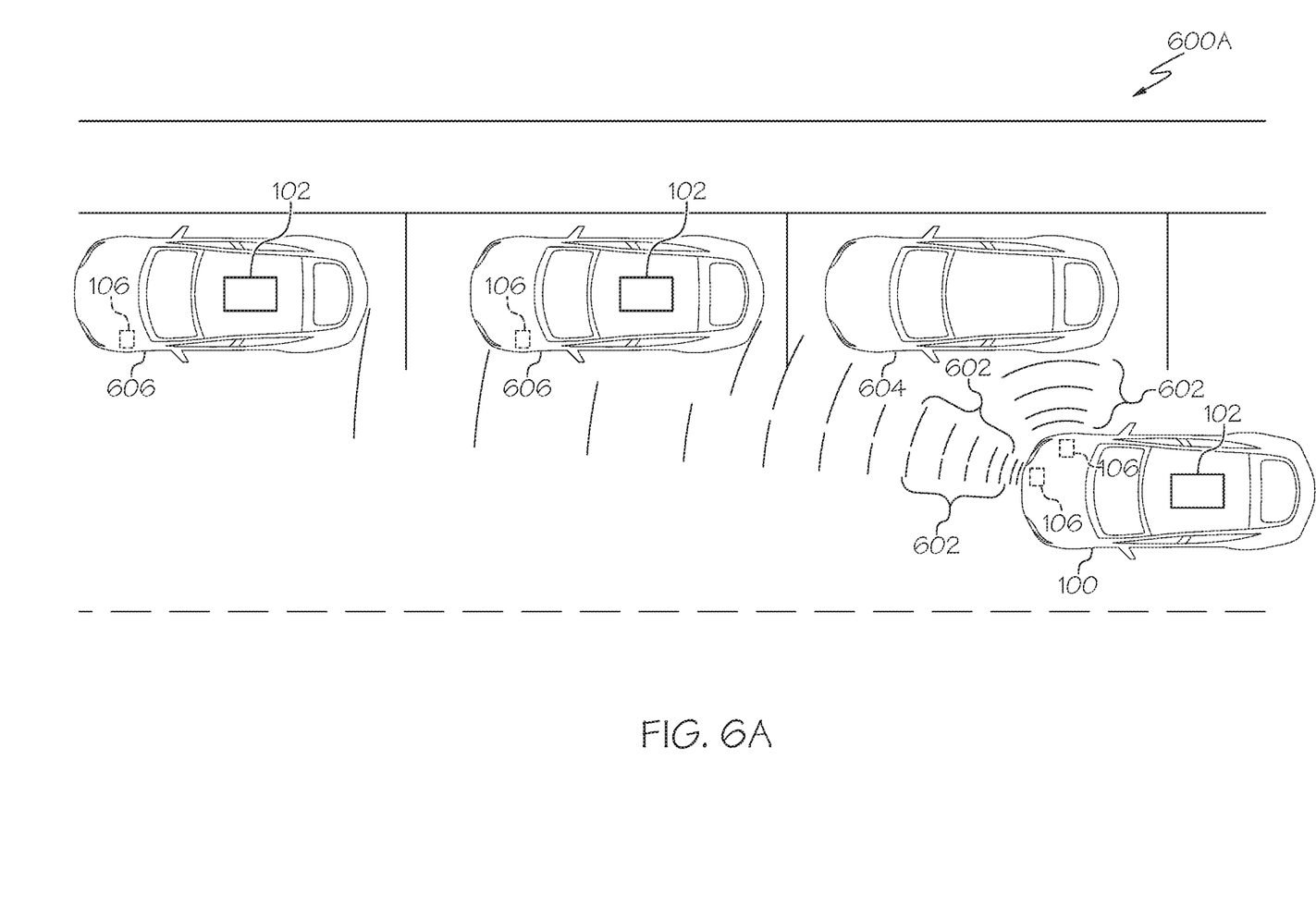
FIG. 6A schematically depicts an overhead view of a subject vehicle communicating with parked vehicles that are not actively monitoring the vicinity, according to one or more embodiments described and illustrated herein.

Turning to FIG. 6A, an overhead view 600A schematically depicts a subject vehicle 100 sending a communication 602 to parked vehicles in the vicinity. In this embodiment, two of the parked vehicles are connectable vehicles 606, and a third parked vehicle is a non-connectable vehicle 604. As discussed above, the connectable vehicles 606 may utilize a power-save mode (i.e., powered down) for a variety of reasons, including battery power conservation. In this embodiment, the connectable vehicles 606 only scan their respective vicinities when requested to do so, such as depicted here where a subject vehicle 100 sends a communication 602 to connectable vehicles 606. One or more communications 602 may utilize any suitable wireless protocol, and communications are sent in this embodiment by one or more sensors 106 of the subject vehicle 100. In other embodiments, communications 602 may be sent utilizing the transmitter 102 and/or communication equipment (not shown) of the subject vehicle.

Figure 6B:
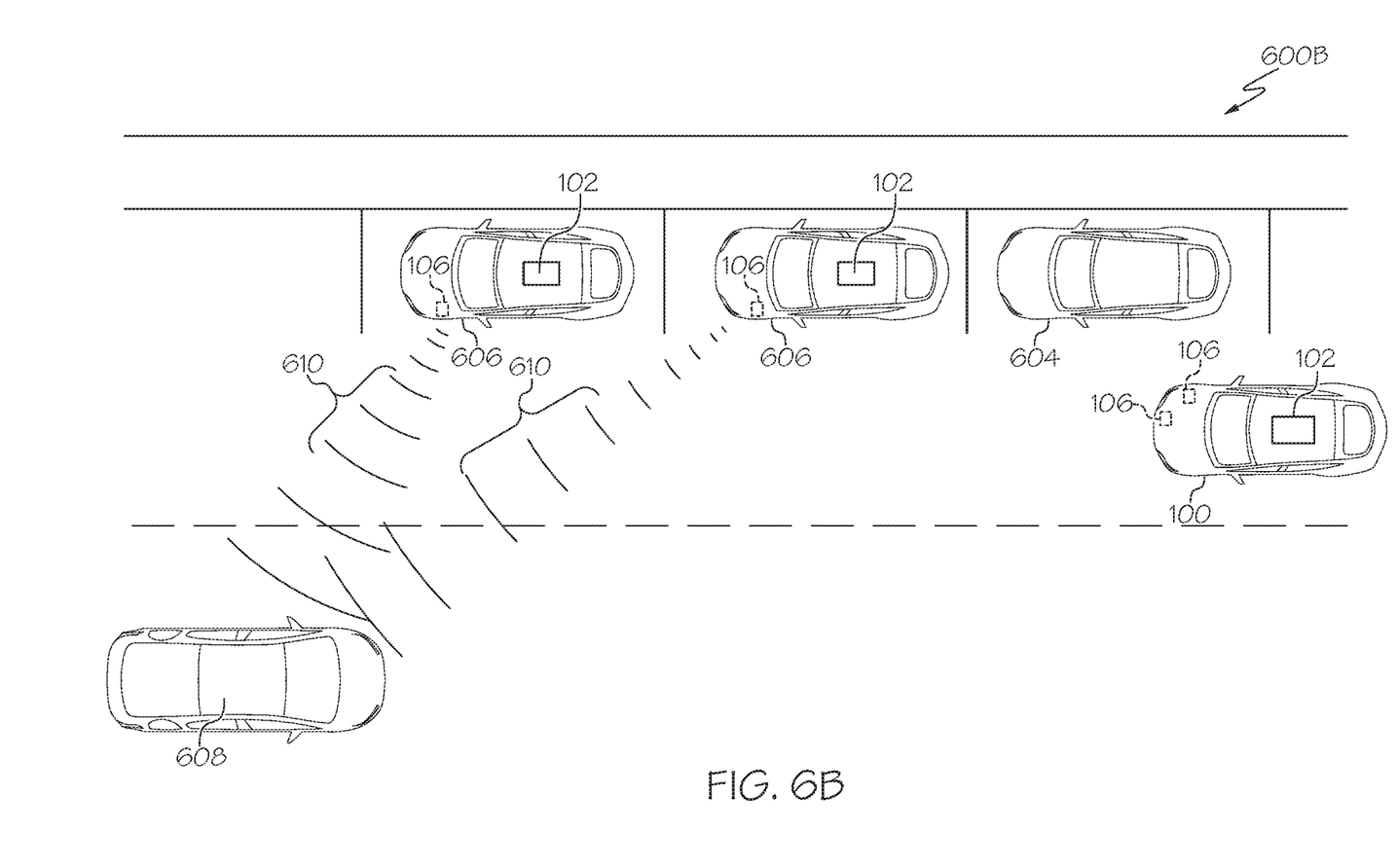
FIG. 6B schematically depicts an overhead view of parked vehicles detecting an oncoming vehicle, according to one or more embodiments described and illustrated herein.

Turning to FIG. 6B, an overhead view 600B continues with the schematic depiction from FIG. 6A, wherein some of the parked vehicles detect an oncoming vehicle 608. The two connectable vehicles 606 have been received communication(s) from the subject vehicle 100 and have been activated. In response, the connectable vehicles 606 each utilize their respective sensors 106 for detection 610 of an oncoming vehicle 608 approaching them as well as the subject vehicle 100. In some embodiments, the transmitter 102 may be utilized with or in lieu of the sensors 106.

Figure 6C:
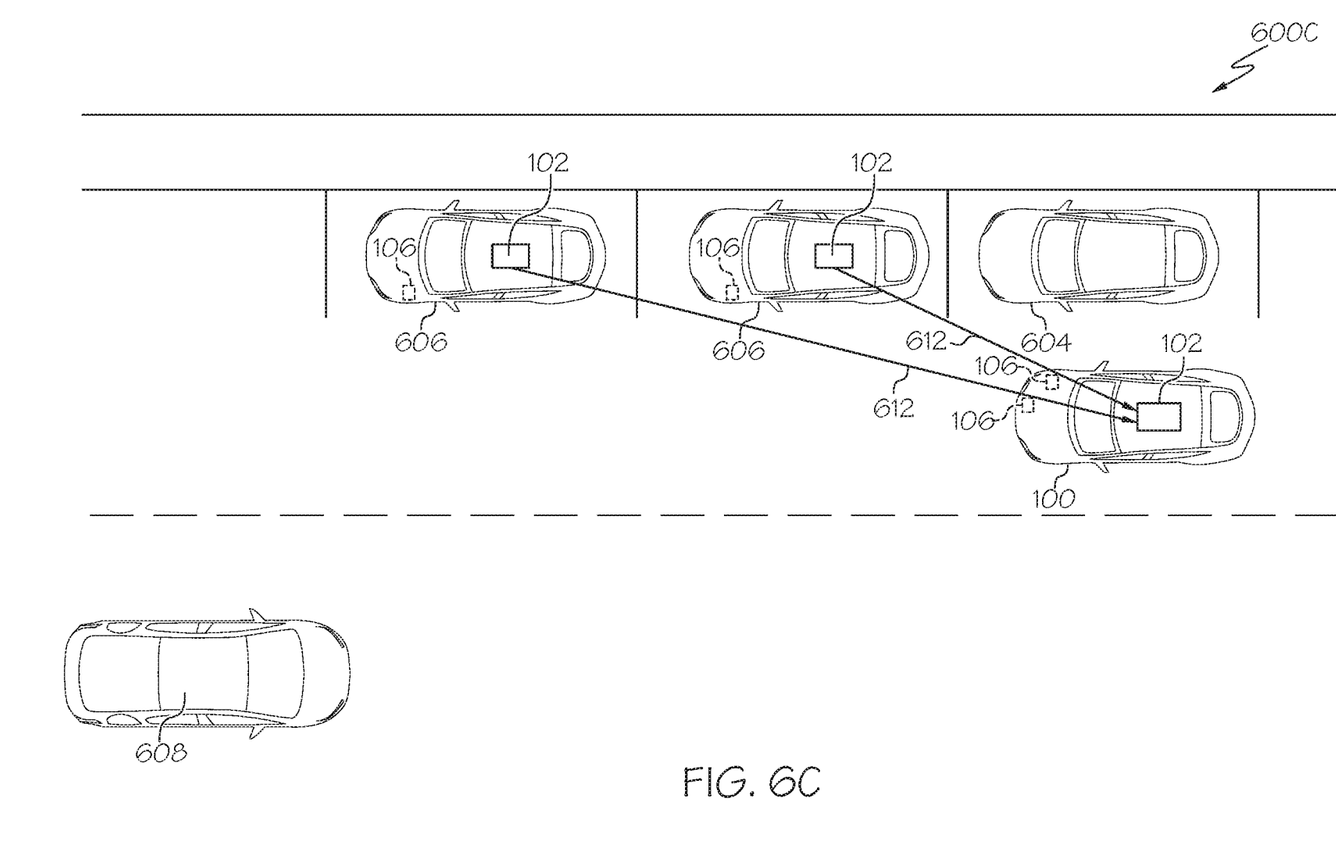
FIG. 6C schematically depicts an overhead view of the parked vehicles reporting the oncoming vehicle to the subject vehicle, according to one or more embodiments described and illustrated herein.

Turning to FIG. 6C, an overhead view 600C continues with the schematic depiction from FIGS. 6A-B wherein the parked vehicles report the oncoming vehicle 608 to the subject vehicle 100. In response to detecting the oncoming vehicle 608, the connectable vehicles 606 each send a transmission 612 to the subject vehicle 100 in order to alert it that the oncoming vehicle 608 is approaching. Although depicted as approaching from directly ahead, this embodiment may further provide for alerts to the subject vehicle 100 where the oncoming vehicle 608 is approaching from elsewhere, such as around a corner, where vehicles would not be able to see each other due to parked connectable vehicles 606 and/or parked non-connectable vehicles 604.

Figure 6D:
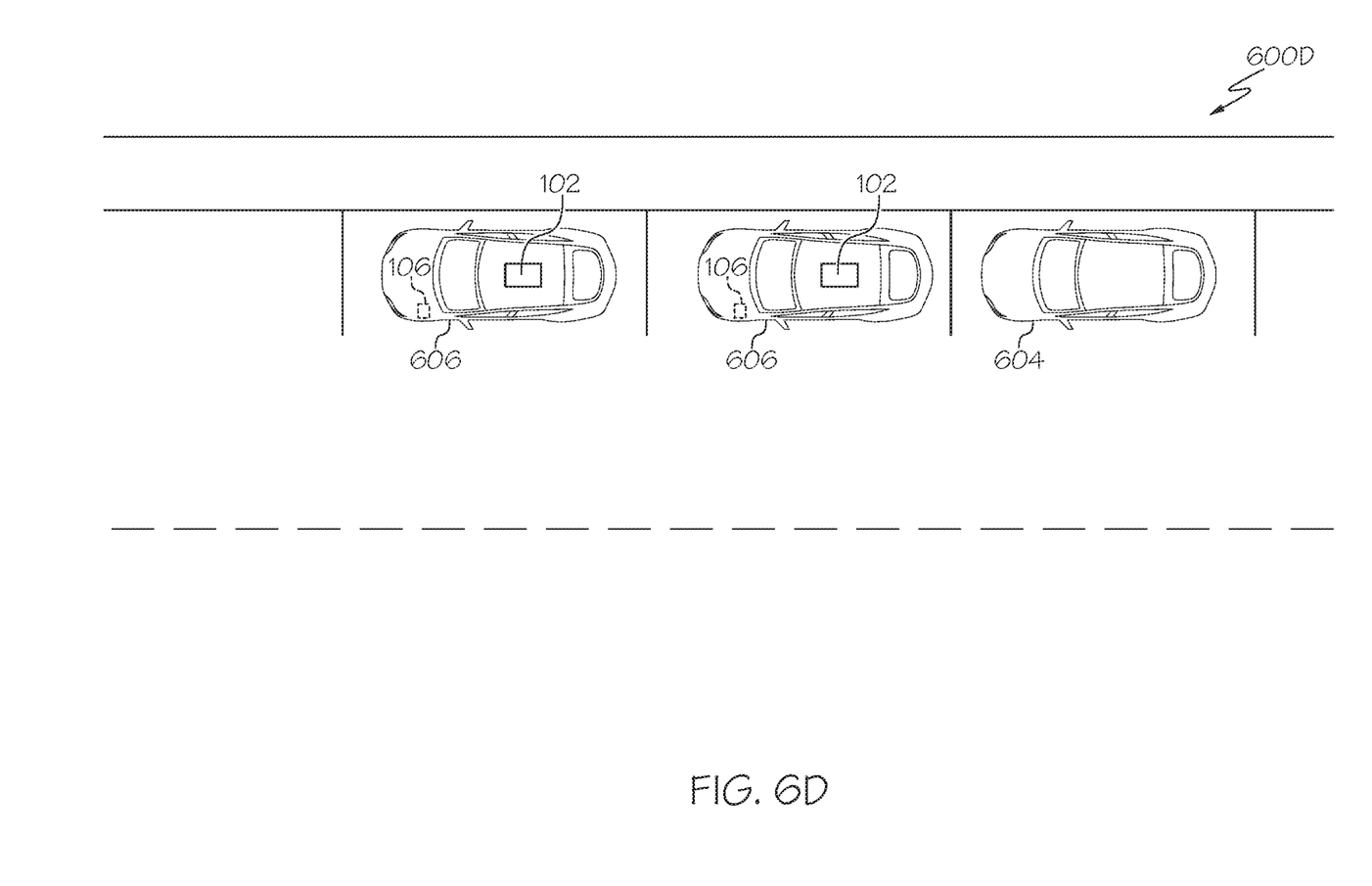
FIG. 6D schematically depicts an overhead view of the parked vehicles that have returned to a low-power mode, according to one or more embodiments described and illustrated herein.

Turning to FIG. 6D, an overhead view 600D continues with the schematic depiction from FIGS. 6A-C wherein the parked vehicles are no longer actively monitoring. The subject vehicle 100 and the oncoming vehicle 608 have now both left the vicinity. Having not received any further communications from subject vehicle 100 and/or the oncoming vehicle 608, the connectable vehicles 606 return to a power-saving mode to conserve power. In other embodiments, connectable vehicles may power down to a low-power mode based upon a duration value, remote commands, the current power level of the connectable vehicle 606, and/or the like.

It should now be understood that a subject vehicle may communicate with connectable vehicles within a vicinity, either directly or otherwise indirectly through networks that connect the vehicles. At least some of the connectable vehicles may have one or more sensors that can detect events that may be relevant to the subject vehicle, such as oncoming vehicles, pedestrians, conditions that warrant slowing down, such as rough weather or construction zones, and the like. By maintaining this communication, the connectable vehicles may alert the subject vehicle as to such events that are detected by the sensor(s) of the connectable vehicles. In some embodiments, a connectable vehicle may utilize a low-power mode to conserve energy by not constantly utilizing its sensor(s) to monitor its environment (i.e., the area or vicinity). However, when a subject vehicle seeking information related to potential events approaches the vicinity, the connectable vehicle may activate and utilize its sensor(s) to report event data the approaching subject vehicle. The approaching subject vehicle may then be able to react to the event that would have otherwise been a surprise. To conserve power, the connectable vehicle may return to its low-power state once the subject vehicle has left the vicinity.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A subject vehicle comprising:
one or more processors; and
a non-transitory computer readable memory storing instructions that, when executed by the one or more processors, cause the one or more processors to:
establish a connection with a connectable vehicle when a distance to the connectable vehicle falls below a threshold and activate the connectable vehicle from a low-power state to activate sensors associated with the connectable vehicle;
receive a detection alert from the connectable vehicle detecting that an event is or will be occurring;
modify operation of the subject vehicle based on the detection alert; and return the connectable vehicle to the low-power state after operation of the subject vehicle is modified, wherein a calendar is used in combination with location data to provide dates and durations of time that connectable vehicles at a particular location are to be activated and then returned to a low-power state.

2. The subject vehicle of claim 1, wherein establishing a connection comprises activating the connectable vehicle from a low-power state to activate sensors associated with the connectable vehicle.

3. The subject vehicle of claim 1, wherein the event corresponds to a pedestrian walking in front of the subject vehicle and the modified operation is braking.

4. The subject vehicle of claim 1, wherein the event corresponds to an approaching vehicle that is not visible from the subject vehicle.

5. The subject vehicle of claim 1, wherein the event corresponds to a hazardous road condition.

6. The subject vehicle of claim 1, wherein establishing a connection further comprises utilizing a network between the subject vehicle and the connectable vehicle.

7. The subject vehicle of claim 6, wherein utilizing a network further comprises creating or updating a sensor-produced map based upon vehicle sensor data received from a plurality of connectable vehicles.

8. A method for utilizing a vehicle sensor network, the method comprising:
   establishing a connection between a subject vehicle and a connectable vehicle when a distance between the subject vehicle and the connectable vehicle falls below a threshold and activating the connectable vehicle from a low-power state to activate sensors associated with the connectable vehicle;
   receiving, at the subject vehicle, a detection alert from the connectable vehicle indicating an event is or will be occurring;
   modifying operation of the subject vehicle based on the detection alert; and
   returning the connectable vehicle to the low-power state after operation of the subject vehicle is modified, wherein a calendar is used in combination with location data to provide dates and durations of time that connectable vehicles at a particular location are to be activated and then returned to a low-power state.

9. The method of claim 8 wherein establishing a connection comprises activating the connectable vehicle from a low-power state to activate sensors associated with the connectable vehicle.

10. The method of claim 8 wherein the event corresponds to a pedestrian walking in front of the subject vehicle and the modified operation is braking.

11. The method of claim 8 wherein the event corresponds to an approaching vehicle that is not visible from the subject vehicle.

12. The method of claim 8 wherein the event corresponds to a hazardous road condition.

13. The method of claim 8 wherein establishing a connection further comprises utilizing a network between the subject vehicle and the connectable vehicle.

14. The method of claim 13 wherein utilizing a network further comprises creating or updating a sensor-produced map based upon vehicle sensor data received from a plurality of connectable vehicles.

15. The subject vehicle of claim 1, wherein the instructions further cause the one or more processors to instruct the connectable vehicle to provide a visual or audio alert to a pedestrian regarding the approaching subject vehicle.

* * * * *